July 20, 1937.  E. CONSTAM  2,087,232

TRACTION LINES FOR SKI RUNNERS AND OTHER PASSENGERS

Filed Feb. 21, 1935  6 Sheets-Sheet 1

Inventor:
Ernst Constam.
By Sommers & Young.
Attys.

July 20, 1937.  E. CONSTAM  2,087,232
TRACTION LINES FOR SKI RUNNERS AND OTHER PASSENGERS
Filed Feb. 21, 1935  6 Sheets-Sheet 2

Inventor:
Ernst Constam
By
Sommers & Young
Attys.

July 20, 1937. E. CONSTAM 2,087,232
TRACTION LINES FOR SKI RUNNERS AND OTHER PASSENGERS
Filed Feb. 21, 1935 6 Sheets-Sheet 3

July 20, 1937.  E. CONSTAM  2,087,232

TRACTION LINES FOR SKI RUNNERS AND OTHER PASSENGERS

Filed Feb. 21, 1935   6 Sheets-Sheet 4

Inventor:
Ernst Constam,
By Sommers & Young
Attys.

July 20, 1937.  E. CONSTAM  2,087,232
TRACTION LINES FOR SKI RUNNERS AND OTHER PASSENGERS
Filed Feb. 21, 1935  6 Sheets-Sheet 5

July 20, 1937.  E. CONSTAM  2,087,232

TRACTION LINES FOR SKI RUNNERS AND OTHER PASSENGERS

Filed Feb. 21, 1935  6 Sheets-Sheet 6

Inventor:
Ernst Constam
By Sommers & Young
Attys

Patented July 20, 1937

2,087,232

UNITED STATES PATENT OFFICE 2,087,232

TRACTION LINES FOR SKI-RUNNERS AND OTHER PASSENGERS

Ernst Constam, Zollikon, Zurich, Switzerland

Application February 21, 1935, Serial No. 7,657
In Switzerland August 17, 1934

9 Claims. (Cl. 104—173)

This invention relates to traction lines for ski-runners and other passengers.

Such plants equipped with handles or girdles for the uphill-haulage of ski runners and pedestrians are already known. Handles, however, require the use of both hands of the ski runner and tire him out unduly, particularly when ascending long and steep slopes. Girdles cause pain to the ski runner in the loins, bring his clothes out of order and are more or less dangerous. Handles and girdles both have the disadvantage that the pull exerted thereby is applied to the ski runner above the center of gravity of his body. Thus, it is strenuous for the ski runner to maintain his body in equilibrium.

According to this invention the traction line is equipped with conveyor members adapted for pushing the passengers from behind at the center of gravity of the body. This is the clew of the problem as the successful construction and operation of a plant constructed by myself after numerous tedious tests have proved.

In the accompanying drawings three embodiments of the traction line according to the invention, together with modified detail arrangements thereof and details of parts are shown, partly in a schematical manner, by way of example only, in which—

Figure 1:
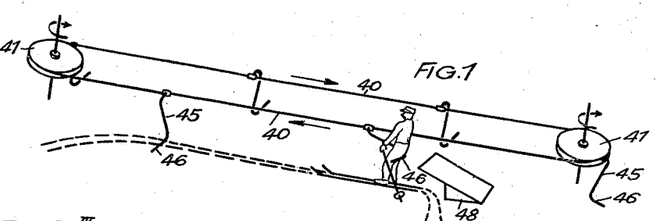
Fig. 1 shows an elevational view of a first embodiment of the traction line according to the invention.
Figures 2, 3, 4, 5:
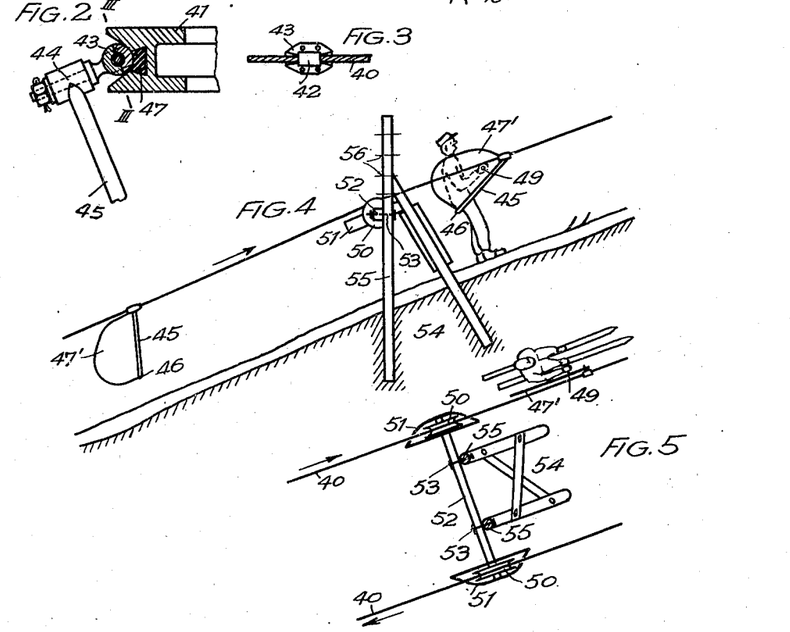
Fig. 2 shows a sectional view of a detail.
Fig. 3 shows a section on the line III—III in Fig. 2.
Fig. 4 is an elevational view on a larger scale than Fig. 1 of a variant detail arrangement of the first embodiment.
Fig. 5 shows a plan view of Fig. 4.

In the embodiment shown in the Figs. 1 to 3 the circulating traction rope 40 is actuated in a known manner by one of two driving disks or rope sheaves 41. The guide groove for the rope in the rim of the respective disk is conveniently lagged with leather, as shown at 47 in Fig. 2. Sockets 42 are clamped to the rope also in a known manner. Bipartite pivotal shackles 43 are pushed on these sockets and are screwed together. Each pair of shackles has a pivot 44 to which the shank 45 of the conveyor member 46 is linked.

The conveyor members 46 together with their shanks 45 thus can swing relative to the traction rope 40 in the direction of the haulage, but should not touch the snow on the ground when hanging down unused or vacant. When starting out for travelling on the traction line, the ski-runner sits on the outer edge of the ramp 48 set on the snow. The next oncoming conveyor member sliding over the ramp then seizes the ski-runner from behind, as shown in Fig. 1.

Guide rollers for the traction rope 40 of the kind hereinafter described are unsuitable for use in the construction shown by Figs. 1 to 3 within reach of the passengers travelling on the traction line, as a ski-runner might easily hurt a hand in between the traction rope and a roller. If a wire cable is used as traction rope, danger also exists that the ski-runners may be hurt by the usually sharp ends of broken wires or be soiled by lubricating grease adhering to the wire cable.

Figure 6:
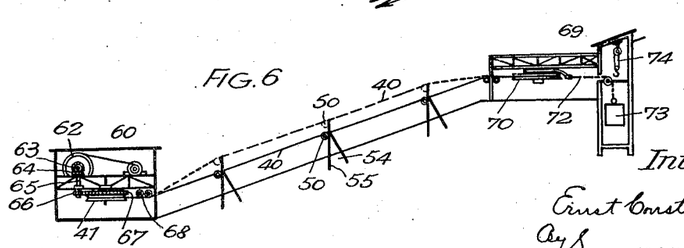
Fig. 6 is an organization drawing of the traction line.

In the variant detail arrangement of the traction line shown in the Figs. 4 to 6, the shanks 45 of the conveyor members 46 are provided with protection shields 47' made, for example, of light sheet metal or of wire mesh. During the haulage the ski-runners hold with the right hand handles 49 provided for this purpose. The rollers 50 guiding the traction rope 40 are equipped with protection bars 51 for guiding the shanks 45 and the protection shields 47'. The axles 52 of the rollers 50 are secured to vertical pillars 55 of wooden supports 54 by means of bolts 53. The vertical posts 55 have several bolt holes 56 permitting the raising or lowering of the rollers 50 and thereby the rope 40 in accordance with the variable depth of the snow deposits, as indicated by chain dotted lines in Fig. 6.

The driving station 60 is provided with an electric motor 61 which by means of a driving belt drives the pulley 62 and the horizontal shaft 63; the shaft 63 drives the vertical shaft 65 by the toothed miter gear 64. The pinion 66 on the vertical shaft 65 drives a large spur wheel 67 which is secured to the rope sheave 41. It is desirable to drive the rope sheave 41 and the traction rope 40 at variable speed. This is particularly desirable when the traction line according to the invention is operated also for the convenience of pedestrians during the time of the year which is free of snow. The pedestrians apply the conveyor members to the backside in exactly the same manner as the ski-runners and are thus effectively assisted in walking, particularly in ascending.

If a direct current motor is employed the speed of the same can be easily regulated. For regulating three-phase motors, however, it is necessary to equip them with adjustable brushes or to provide interchangeable driving pulleys of different diameters or else other mechanical or hydraulic speed regulating means.

The rope tensioning station 69 is provided with a loose rope sheave 70 the carriage of which is pulled towards the right by action of a tensioning rope 72 and a counterweight 73. A tackle 74 serves for lifting the counterweight 73 when the rollers 50 of the traction rope are readjusted, as previously referred to.

Alternatively the traction rope driving arrangement may be housed in the upper station and the rope tensioning device in the lower station. Furthermore, horizontal traction lines having both end stations situated at the same level may be designed.

In the modified detail arrangement of the traction line shown in the Figs. 7 to 10 the protection shield 47' is connected with the traction rope by means of a shackle 43 with pivot 44. A sleeve 75 on the other hand surrounds the traction rope 40 with clearance and has its own pivot 76. The lower end of the protection shield bears a weight 77 maintaining the plate in the position shown. The conveyor member 46 is broad to accommodate tall and small passengers as well.

Figures 7, 8, 9, 10, 11, 12, 13:
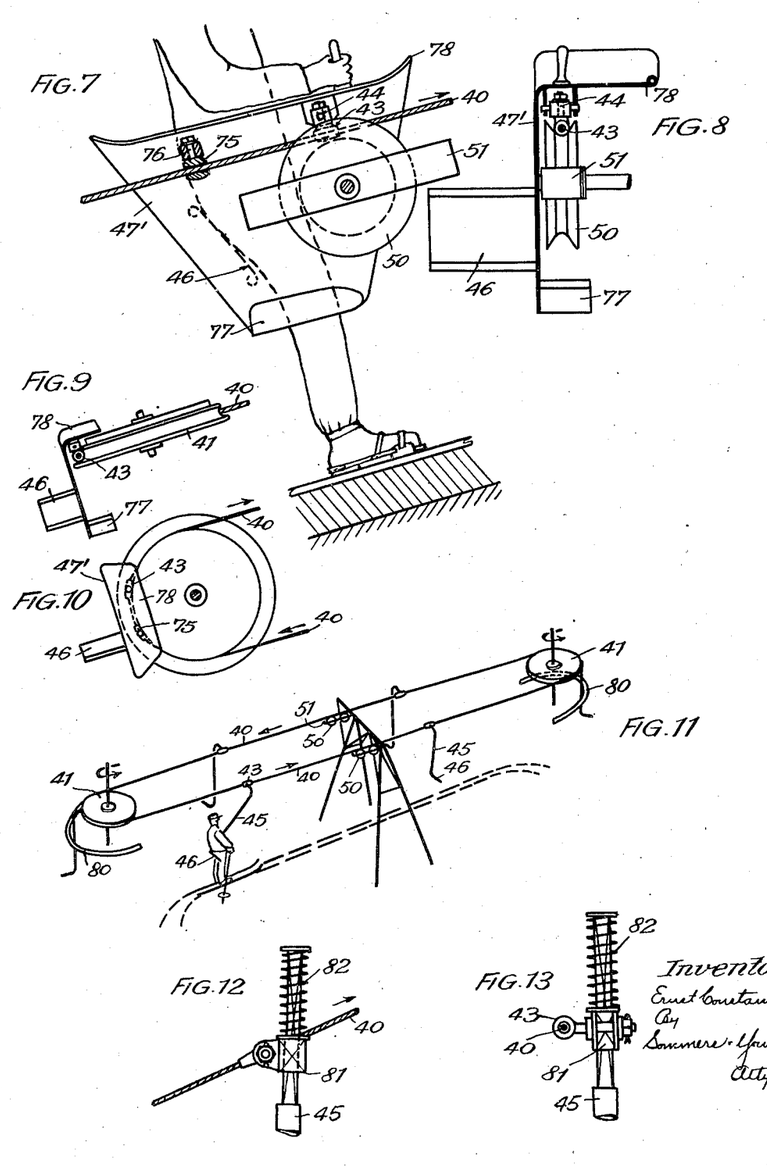
Fig. 7 shows a view of a modified detail arrangement of the first embodiment on a larger scale.
Fig. 8 shows a sectional side elevation of Fig. 7.
Figs. 9 and 10 illustrate a further detail in a sectional elevation and a corresponding plan view.
Fig. 11 shows a further detail arrangement of the first embodiment of the invention.
Figs. 12 and 13 show in a front and a side elevation respectively a still further detail of the first embodiment of the invention.

In the Figs. 9 and 10 the shape of the rope guide groove of the sheaves 41 is shown as well as the manner in which the conveyor members pass round the rope sheaves, the upper portions 78 of the protection shields 47' resting from above against the rim of the sheaves, when the weights 77 are urged outwards by action of centrifugal force.

Rollers for keeping down the traction rope, as shown in Fig. 6 under the reference numeral 68 are improper for use in the construction depicted in the Figs. 7 to 10 on account of the presence of the upper portions 78 and of the pivots 44 and 76. Therefore the rope sheave 41 on the downhill side must be inclined in alignment with the inclination of the traction rope on the open track, the same as shown in Fig. 1.

In a further detail arrangement of the first embodiment of the invention, shown in Fig. 11, the shanks 45 of the conveyor members 46 are longer than in the previously described constructions. Around the rope sheaves 41 suitable guide rails 80 are provided preventing the conveyor members 45, 46 from swinging too far out.

It is desirable that the succeeding conveyor members do not interfere with ski-runners that may have come to fall on the road way of the traction line. The detail construction shown in the Figs. 12 and 13 tries to prevent this as much as possible. The shanks 45 of the conveyor members therefore slide in sockets 81 fastened to the pivots 44 and the shackles 43 on the traction rope 40. Coil springs 82 are provided for raising the conveyor members when vacant.

It is furthermore desirable, that the succeeding passengers can ride past one having come to fall on the roadway of the traction-line and that passengers can not start on the ride on the open track but at certain spots where guards control the tickets. It is indispensable that a considerable bearing pressure be maintained between the traction rope and the rollers 50 in order to prevent the traction rope being disengaged from the rollers by inadvertence of the passengers. This however can be eliminated with the aid of suitable counter rollers 83 cooperating with the rollers 50 (Fig. 14) provided that the socketed shackles 43, are of the type shown in the Figs. 2 to 6 and 11 to 13, i. e. are fit for being used with rollers below and above the traction rope. In the detail arrangement of the second embodiment of the invention shown in the Figs. 15 and 15a a hanger 85 with a weighting block 87 is correlated to each conveyor member 45 and 46. The weighting block is linked eccentrically to the lower end of the hanger 85 in such a way that the block shifts downwardly until the stop indicated at 84 bears against the extreme lower end of the hanger 85. The conveyor member 46, i. e. the shank 45 thereof is secured to the weighting block 87. Thus, by grasping the conveyor member 46 the ski-runner can pull this member down and apply it to the back of his body as shown in Fig. 15 in dotted lines.

Figures 14, 15, 15A, 16, 17, 18, 18A:
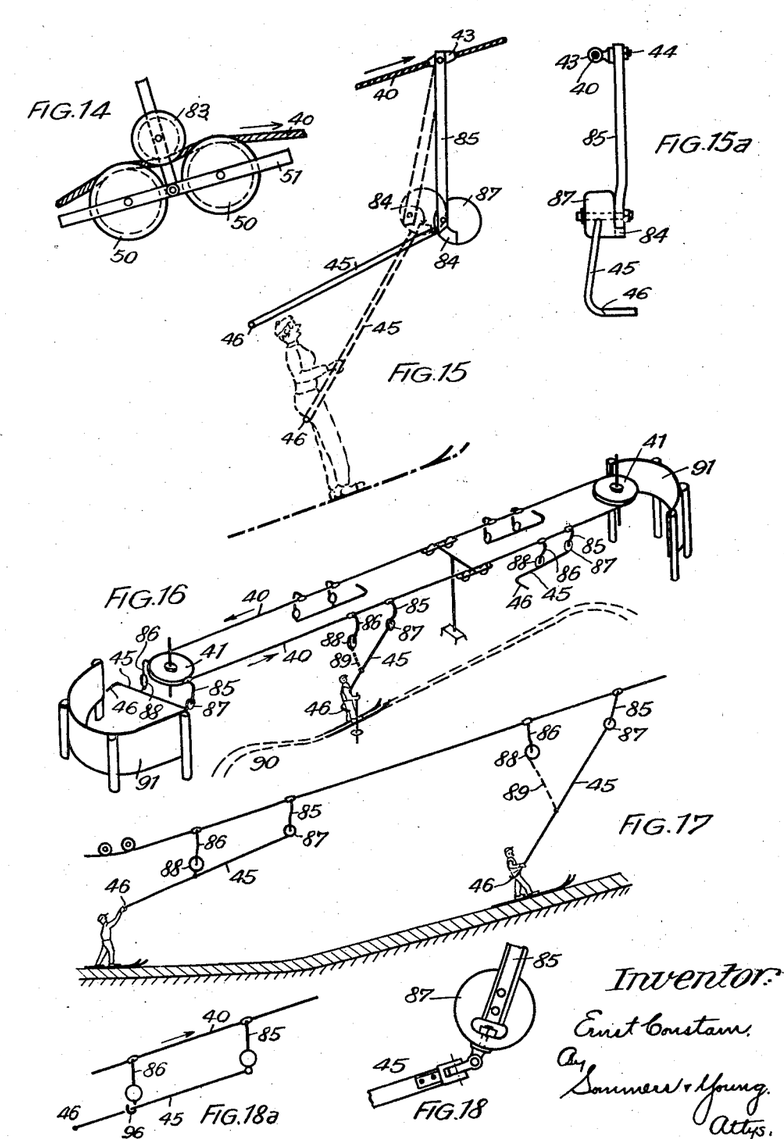
Fig. 14 represents a typical detail view.
Figs. 15 and 15a show in an elevation and a side view respectively a detail arrangement of the second embodiment of the invention.
Fig. 16 shows an organization view of a modification of the second embodiment.
Fig. 17 is an elevational view on a larger scale than Fig. 16 of a portion of the traction line.
Fig. 18 is a view of a detail.
Fig. 18a is a variant construction of the second embodiment.

In the variant detail arrangement shown by Figs. 16 to 18, two hangers 85 and 86 are correlated to each conveyor member 45, 46; the hangers may be connected to the traction rope 40 as shown in Figs. 2 and 3. The front hangers 85 are provided with weighting blocks 87 at their lower ends. The rear hangers 86 carry at their lower ends automatic lifting devices 88 as will be hereinafter described. These lifting devices are adapted to pull in automatically lifting ropes 89, in order to lift the shanks 45 of the conveyor members 46 up to the hangers 86 when the ski-runners release the conveyor members 46. Only at the starting place 90 the conveyor members 46 are lowered so far down above the surface of the snow that the ski-runners after having paid the fare can grasp and apply them to the rear side of the body. The inner ends of the shanks 45 are fastened to the weighting blocks 87 by means of three link joints as shown in Fig. 18, enabling the conveyor members to ride around the rope sheaves 41, as shown in Fig. 16. Guide walls 91, arranged near the rope sheaves 41, limit the conveyor members from undue swinging movements by effect of centrifugal force.

Fig. 18a shows an arrangement similar to that of Figs. 16, 17 and 18. The front and the rear hangers 85 and 86 carry weighting blocks 87 at their lower ends. The weighting blocks of the hangers 86 have hooks 96 on which the conveyor members 45, 46 are suspended when vacant.

Figure 19:
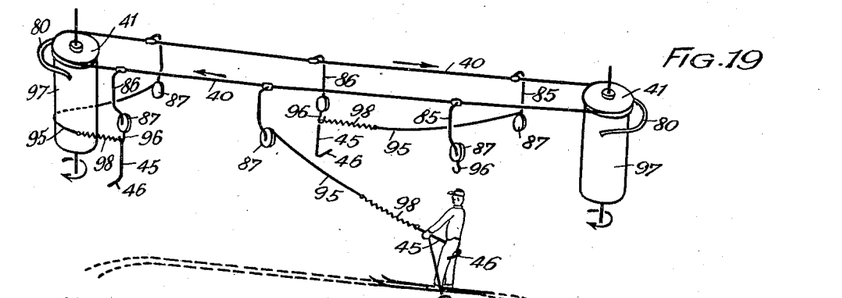
Fig. 19 is an organization view of a third embodiment of the invention.

In the detail arrangement of the traction line shown in Fig. 19, the conveyor members 46 are connected to the front hangers 85 by means of their shanks 45 and drag ropes 95. The latter allow the ski-runners to ride laterally past an obstacle that may obstruct the roadway of the traction line. The rear hangers 86 are provided with the hooks 96 for suspending the vacant conveyor members. Drums 97, made for example of thin sheet metal, rotate together with the grooved rope sheaves 41 and guide the conveyor members, drag ropes and hangers around the rope sheaves. Fixed guide rails 80 prevent the conveying elements from swinging too far out by action of centrifugal force and thereupon to swing inwards unduly after having passed the respective drum. If the exterior guide rails 80 are so close to the drums that the hangers can not swing out at all the subsequent inward swinging is also prevented. In cases where for some reason or other the diameter of the drums 97 are made smaller than that of the rope sheaves 41, elastic tension members 89 combined with the drag ropes 95 maintain the drag-ropes taut also when the latter pass around the drums thus preventing the drag ropes from undue sagging or even sliding down along the drums whereby the drag ropes might entangle. Wire coil springs or rubber strings may serve as tension members 98.

Figure 20:
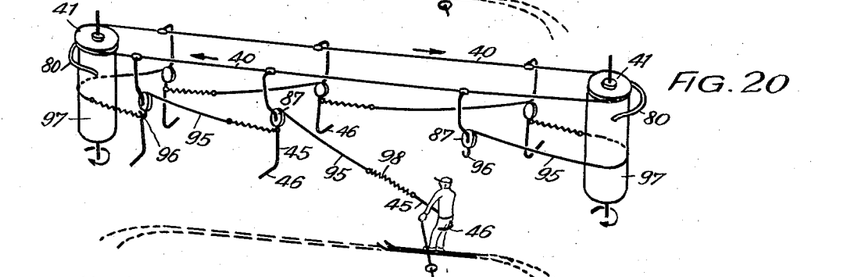
Fig. 20 is a view similar to Fig. 19.

In the detail arrangement of the traction line shown in the Fig. 20, there are twice as many conveyor members as in the arrangement of Fig. 19. Therefore at the same speed of the traction rope the conveying capacity of the traction line per unit of time is doubled. The rear hangers serve at the same time as front hangers for the next following conveyor members. In the event of a ski-runner having come to fall and releasing the conveyor member which he had occupied, this member is dragged along over the surface of the snow and might incrust with ice and entangle with objects or with persons that may happen to be on the roadway.

Figure 21:
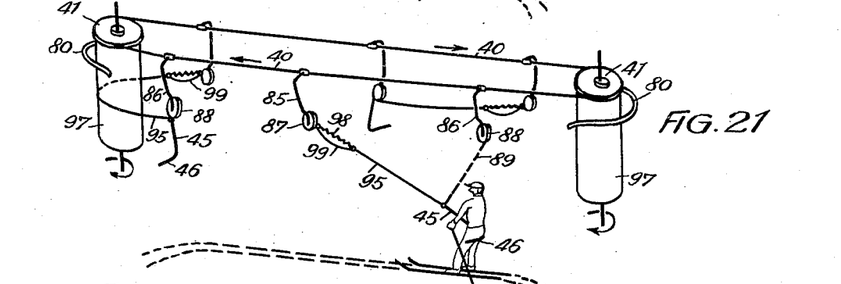
Fig. 21 shows a view of a further variant arrangement of the third embodiment.

In the construction shown in Fig. 21, the rear hangers 86 are provided with automatic lifting devices 88 which by means of the lifting ropes 89 lift the shanks 45 of the conveyor members 46 up to the rear hangers whenever the conveyor members are released by the passengers.

Figure 22:
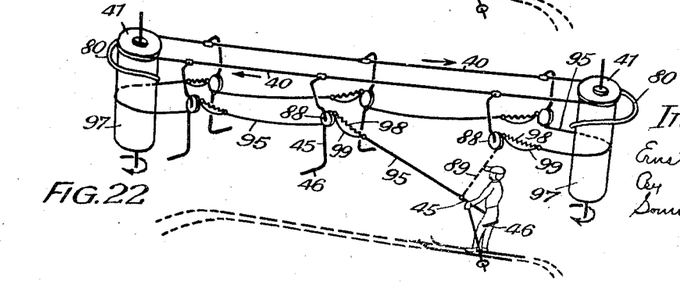
Fig. 22 is a view similar to Fig. 21.
Figures 23, 24, 25, 26, 27, 28, 29:
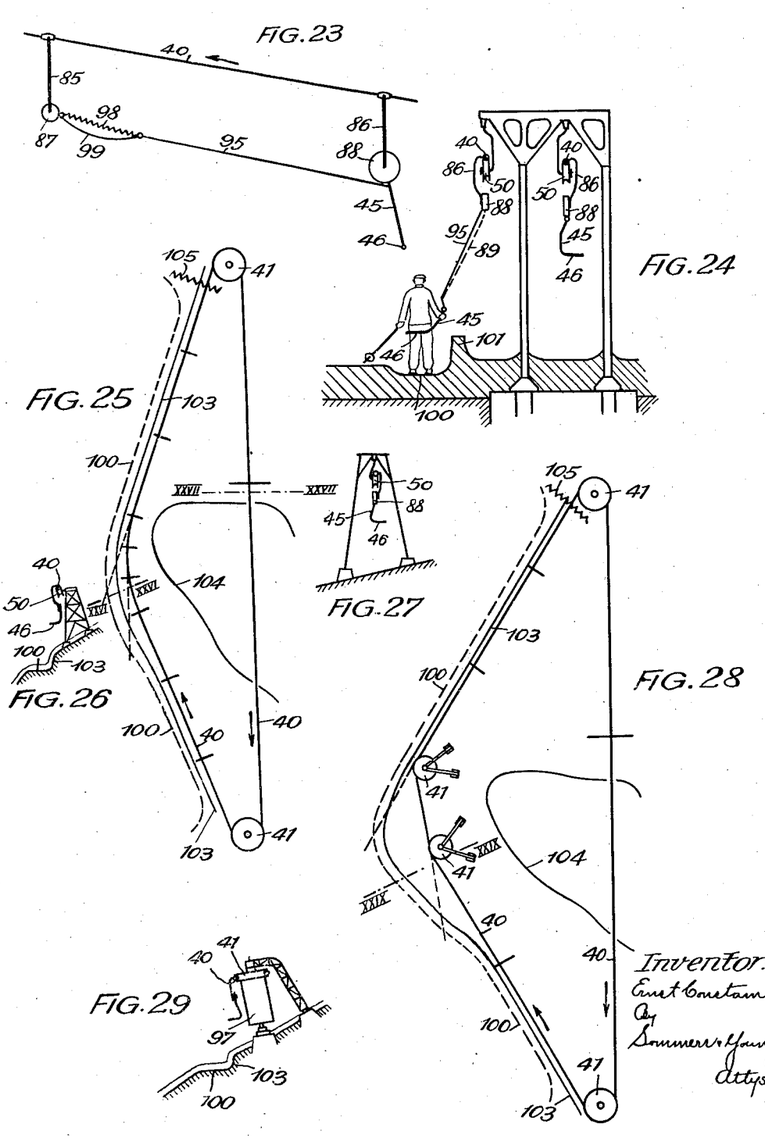
Fig. 23 is an elevational view of a detail of the third embodiment.
Fig. 24 shows a cross-profile of the third embodiment.
Fig. 25 is a situation plan for all three embodiments of the invention.
Fig. 26 is a section on the line XXVI—XXVI of Fig. 25.
Fig. 27 is a section on the line XXVII—XXVII of Fig. 25.
Fig. 28 is a modified situation plan for all three embodiments.
Fig. 29 is a section on the line XXIX—XXIX in Fig. 28.

The modified detail arrangement of the traction line shown in Fig. 22 is derived from that shown in Fig. 21 by doubling the number of conveying members. At the same speed of the traction rope the conveying capacity per unit of time is twice that of the arrangement of Fig. 21. Here again the rear hangers serve as front hangers for the next following conveying members. In the arrangement shown in the Figs. 21 and 22 it is advisable to lower the traction rope 40 at the starting place only, so that only there the passengers can reach and grasp the conveyor members and can start travelling on the traction line. On the open track the conveyor members travel so high above the snow that unauthorized ski-runners not having paid the fare can not reach the conveyor members, and that ski-runners can cross the roadway without being hit by vacant conveyor members. Another advantage of the constructions shown by Figs. 21 and 22 is that the headway between the roadway and the traction rope 40 can vary within the limits afforded by the length of the fully extended and fully pulled in lifting rope 89. The elastic tension members 98 inserted in the drag ropes are weaker than the lifting devices 88 so that the latter can pull in the lifting ropes 89 completely. Relieving ropes 99 are therefore necessary in parallel with the tension members as shown in Fig. 23 to protect the latter against being unduly strained. Individual single steel wires, weighing very little and sagging very little may serve as drag ropes 95.

Fig. 24 schematically illustrates a cross-profile of the constructions shown by Figs. 21 and 22. The roadway 100 instead of being situated directly underneath the traction rope 40 is disposed sidewardly thereof so that the ski-runners can not be hit by, for example, detachable parts of the overhead structure of the line working loose. A snow parapet 101 or else an appropriate fence is provided bordering the roadway on one side. In some places the snow parapet or the fence may be interrupted in order to allow ski-runners to cross the roadway.

Fig. 25 represents a schematical situation plan of a traction line as shown in the Figs. 1 to 24. The arrows shown in the situation plan indicate the direction of circulation of the traction rope 40 and the direction in which the ski-runners are hauled on the roadway 100 indicated by chain dotted lines. The traction rope arrangement and the roadway instead of being separated by a parapet or fence are separated in this instance by a bank 103 (Figs. 25 and 26). The operative side of the traction line describes a curve in order to avoid the depression 104 of the ground. Four of the total of eight rope-supports on the operative side of the traction line are crowded together at the curve and are provided with obliquely mounted curve guide rollers 50 as evident from Fig. 26. The inoperative return track for the vacant conveyor members is straight when seen from above and provided with a single rope support, as shown in Fig. 27, which in accordance with the larger spans of the inoperative side of the traction rope is higher than the eight supports on the operative side.

In Fig. 28 the operative side of the traction line is deflected by means of two rope sheaves 41 and two drums 97, as shown in Fig. 29. The roadway 100 is sidewardly deflected, as shown in the Figs. 25 and 28, so that the drag ropes 95 during the haulage, when seen in plan, are substantially tangent to the running off sides of the curve guide rollers 50 and of the sheaves 41 of the traction rope. These tangents are indicated by dotted lines in the Figs. 25 and 28. This prevents the hangers 85 and 86 and the drag ropes 95 from being pressed against the rollers 50 of Fig. 26 and the drums of Fig. 29 during operation.

At the end of the roadway of the traction line an automatic limit switch in the form of a barrier 105 is placed across the roadway. Should a ski-runner touch the barrier the electric driving motor of the traction line is automatically stopped in a known manner.

Figure 30:
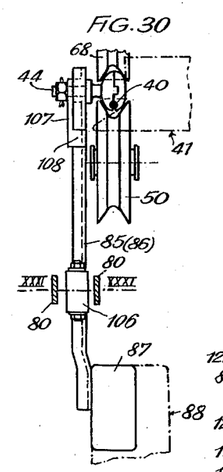
Figs. 30 to 32 are views of further details of the second and third embodiments, Fig. 31 being a section on the line XXXI—XXXI in Fig. 30.
Figure 31:
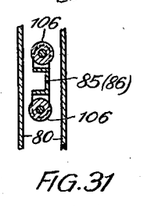
Figure 32:
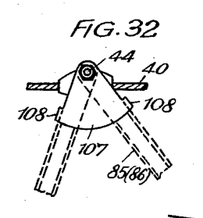

The Figs. 30 to 32 depict details of the embodiment of the invention as illustrated in the Figs. 16, 17, 21 to 29, inclusive. Fig. 31 shows a horizontal section through the hanger 85 (86) illustrated in Fig. 30 on the line XXX—XXX of the latter. In the front and at the back of the U-shaped hanger a freely rotatable roller 106 is arranged for cooperation with guide rails 80 preventing undue transverse swinging movements of the hanger. The hanger is linked to the pivot 44 which is connected to the traction rope 40 by means of a bipartite clamping connection, as shown, and carries on the exterior side a segmental plate 107 with two stops 108 limiting the range of swinging movement of the hanger in the direction of the haulage, as indicated by dotted lines in Fig. 32. The roller 50 supports the traction rope 40 from below. The roller 68 guides the traction rope 40 from above. The rope sheave 41 is of the type used at the ends of the traction line and for curves. 87 is a weighting block for a front hanger 85 and 88 is an automatic lifting device.

Figures 33, 34, 36:
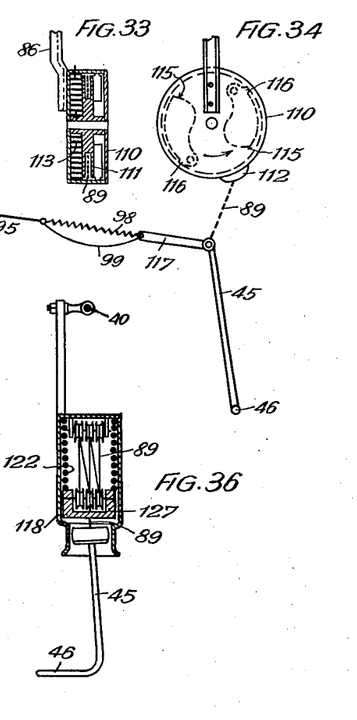
Figs. 33 and 34 show a vertical section and a front elevation respectively of a lifting device for the second and third embodiments.
Fig. 36 is a sectional elevation of a further modification of the lifting device.

The Figs. 33 and 34 show details of a lifting device. The drum 111 on which the lifting rope 89 is wound on and off is rotatably mounted in a casing 110, the rope passing through an opening 112 provided in the shell of the casing 110 to the upper end of the shank 45 of the conveyor member 46. The powerful spiral spring 113 is secured on one hand to the casing 110 and on the other hand to the laterally extended shaft of the drum 111. The spring tends to rotate the drum in the direction of the arrow indicated in Fig. 34. When a ski-runner grasps a conveyor member 46 and pulls it down, the lifting rope 89 unwinds from the rope drum 111 and the spring is additionally tensioned. On the ski-runner's releasing the conveyor members 46, the lifting rope 89 is again wound on to the rope drum 111 by action of the spiral spring 113 until the shank 45 of the conveyor member 46 bears against the casing 110 at the opening 112. In order to avoid the released conveyor member 46 being lifted too abruptly, speed checking means are provided on the rope drum 111 in the form of two centrifugally operating braking blocks 115 which are adapted to damp the angular velocity of the rope drums by frictional engagement at 116 with the shell of the casing 110. Alternatively instead of by means of centrifugally operating braking blocks the velocity of the rope drum 111 may also be checked with the aid of an escapement mechanism such as used in watch-making. The shank 45 of the conveyor member 46 has a flat arm 117 linked to it. At the outer end of the arm 117 the tension member 98 and the correlated relieving rope 99 of the drag wire 95 are attached, the conveyor member 46 thus being prevented from distorting and consequently maintains its transverse disposition to the direction of haulage, even when vacant.

Figure 35:
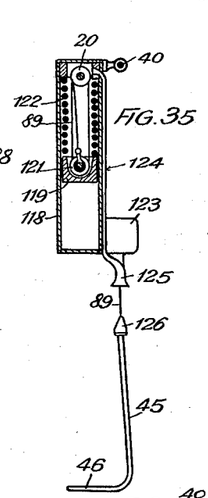
Fig. 35 is a sectional elevation of a modified lifting device.

In Fig. 35 a further modification of the automatic lifting device is illustrated. The hanger of this arrangement substantially comprises a cylinder 118 in which a piston 119 moves downwards when the released conveyor member 46 raises. The cylinder contains in its upper portion a stationary pulley block 120, the piston in turn carrying the movable lower pulley block 121 of the lifting rope 89. The piston is caused to move downwards by action of its own weight and by action of the coil spring 122. The lifting movement of the conveyor member 46 is damped by the effect of the air cushion formed on the underside of the piston. A weighting block 123 adjusts the hanger to the desired position shown. A tube 124 through which the lifting rope is led downwards from the upper pulley block ends in a funnel-shaped mouth piece 125.

The shank 45 of the conveyor member 46 terminates in a conical head 126 of rubber or some other shock cushioning material. The lifting rope 89 pulls the head 126 into the mouth piece 125 in such a manner that the conveyor member 46 can no longer swing relative to the hanger, but is held to the latter. This improves the functioning of the traction line and facilitates the grasping of the oncoming conveyor members by the ski-runners when they start on the haulage.

Fig. 36 shows a further modification of the automatic lifting device. In a cylinder 118 a weight 127 is housed which is urged downwards by action of gravity and of the spring 122. The conveyor member 46 is raised by the lifting rope 89 as shown. The shank 45 of the conveyor member has a dish-shaped upper end. The dished end is lagged with a shock damping material, for example, felt or rubber and is pulled in its end position against the flat underside of the weight 127 by the central traction of the lifting rope 89. Thus the conveyor member 46 is prevented from swinging relative to the hanger. Jerking of the conveyor member 46 and entangling of the same with the traction rope, the supporting rollers of the traction rope or the like is thus effectively avoided.

Figure 37:
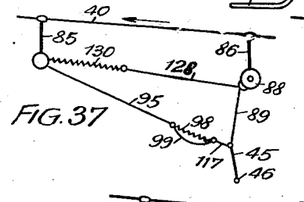
Fig. 37 shows a modified detail arrangement of Fig. 21.

In Fig. 37, 85 represents the front hanger and 86 the rear hanger of Fig. 21. The automatic lifting device 83 comprises a rope winch similar to that described in connection with the Figs. 33 and 34. This winch, however, has no spiral spring, but has a double rope drum 111 and a friction brake acting by effect of centrifugal force. On one of the drums the lifting rope 89 is wound on and off and on the other drum a rope 128 is at the same time wound off and on. The rope 128 is secured to the front hanger 85 by means of powerful tensioning members 130 pulling the rope 128 forwards whereby the lifting rope 89 is wound on and the conveyor member 46 is lifted. Rubber strings or coil springs of steel wire may be used as tensioning members 130.

Figure 38:
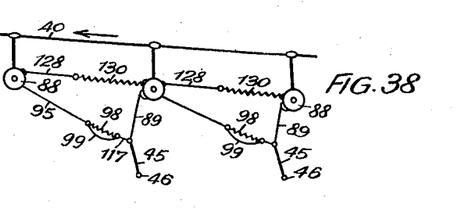
Fig. 38 shows a modified detail arrangement of Fig. 22.

The detail arrangement shown in Fig. 38 is of the same type as the respective arrangements of Fig. 22. Each hanger is associated with a conveyor member 46. The automatic lifting devices 88 correspond to those described in connection with Fig. 37, but here the ropes 128 and the tensioning members 130 act on the respective lifting device from the rear. Then the double rope drum rotates clockwise, the respective tensioning member 130 contracts and the rope 128 is wound off, whereas the lifting rope 89 is wound on.

Figure 39:
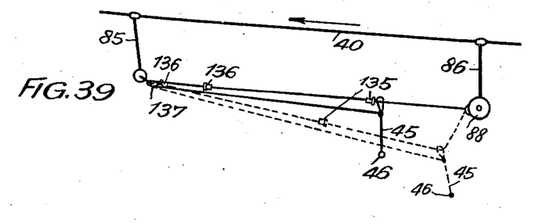
Fig. 39 shows another detail arrangement of the third embodiment of the invention.

In the detail arrangement illustrated in Fig. 39 there is only one rope for dragging and for lifting the conveyor member 46. An automatic spring operated winch 88 pulls in the rope, the latter passing through a ring at the shank 45, then round a guide roller 137 at the front hanger 85 and is fastened to the shank 45 of the conveyor member 46. The rope is provided with two stops 135 and 136. When out of action the conveyor member 46, 45 rests against the stop 135. Under hauling action the stop 136 bears on the roller 137 as shown in dotted lines. This arrangement has the advantage that when starting on the haulage the conveyor members 46 at first remain stationary in the hands of the ski-runners to lag behind the traction rope until the respective stop 36 hits the correlated roller 137.

I do not limit myself to the particular size, shape, number or arrangement of parts as shown and described, all of which may be varied without going beyond the scope of my invention as shown, described and claimed.

What I claim is:

1. In a ski tow, a traction rope, means for supporting said rope elevated above the ground, means for driving said rope, conveyor members connected with said traction rope and circulating therewith, and a projecting portion on each conveyor member extending transversely to the direction of towing for thrustingly pushing the body of a passenger from behind while standing on his skis and leaning against said portion, said projecting portion freely engaging the passenger in the vicinity of his center of gravity, said projecting portions being free of obstructions on one side, thus permitting the passenger to disengage himself from said member without detaching any fastening elements.

2. In a ski tow, a traction rope, means for supporting said rope elevated above the ground, means for driving said rope, conveyor members connected with said traction rope, a projecting portion on each conveyor member extending transversely to the direction of towing for pushing the body of a passenger from behind while standing on his skis and leaning against said portion, said portion freely engaging the passenger in the vicinity of his center of gravity and being free of obstructions on one side, thus permitting the passenger to disengage himself from said member without detaching any fastening elements, and protection means associated for common movement with said conveyor members for protecting the passengers against being hurt and soiled by the traction rope and its supporting means.

3. In a ski tow, a traction rope, means for supporting said rope elevated above the ground, means for circulating the rope, conveyor members connected with said traction rope, a projecting portion on each conveyor member extending transversely to the direction of towing for pushing the body of the passenger from behind while standing on his skis and leaning against said portion, said portion freely engaging the passenger in the vicinity of his center of gravity and being free of obstructions on one side, thus permitting the passenger to disengage himself from said member without detaching any fastening elements, and adjusting means for regulating the height above ground of the traction rope supporting means in accordance with the variable depth of snow deposits on the ground.

4. In a ski tow, an elevated traction rope, means for supporting said rope elevated above the ground, means for circulating said rope, conveyor members pivotally connected with said rope circulating together with said traction rope, a projecting portion on each conveyor member extending transversely to the direction of towing for freely engaging and pushing the body of the passenger from behind in the vicinity of his center of gravity while standing on his skis and leaning against said portion and being free of obstructions on one side, thus permitting the passenger to disengage himself from said member without detaching any fastening elements, and yielding conveyor lifting devices intercalated between the conveyor members and the traction rope permitting lowering the conveyor members into towing position and automatically compensating the varying elevation of the traction rope along the roadway and restoring the conveyor members to elevated position when released.

5. In a ski tow, a traction rope, means for supporting said rope elevated above the ground, means for circulating said rope, conveyor members articulately connected with said rope and circulating together therewith, a projecting portion on each conveyor member extending transversely to the direction of towing for freely engaging and pushing the body of the passenger from behind in the vicinity of his center of gravity while standing on his skis and leaning against said portion, said portion being free of obstructions on one side, thus permitting the passenger to disengage himself from said member without detaching any fastening elements, yielding conveyor lifting devices intercalated between the conveyor members and the traction rope permitting lowering the conveyor members into towing position and automatically compensating the varying elevation of the traction rope along the roadway as well as restoring the conveyor members to raised position when released, and speed checking means associated with said lifting devices for preventing the released conveyor members from being restored at undue speed.

6. In a ski tow, a traction rope, means for supporting said rope elevated above the ground, means for circulating said rope, conveyor members articulately connected to said rope and circulating together therewith, a projecting portion on each conveyor member extending transversely to the direction of towing for freely engaging and pushing the body of the passenger from behind in the vicinity of his center of gravity while standing on his skis and leaning against said portion, said portion being free of obstructions on one side, thus permitting the passenger to disengage himself from said member without detaching any fastening elements, yielding conveyor lifting devices intercalated between the conveyor members and the traction rope, permitting lowering the conveyor members into towing position and automatically compensating the varying elevation of the traction rope above the snow and for restoring the conveyor members to raised position when released, speed checking means associated with said lifting devices for preventing the released conveyor members from being restored at undue speed, and a roadway for the passengers disposed laterally of said traction rope, said conveyor members when vacant, said lifting devices and said speed checking means.

7. In a ski tow, a traction rope, means for supporting said rope elevated above the ground, means for circulating said rope, conveyor members articulately connected with said rope and circulating together with said traction rope, a projecting portion on each conveyor member extending transversely to the direction of the towing for freely engaging and pushing the body of the passenger from behind in the vicinity of his center of gravity while standing on his skis and leaning against said portion, said portion being free of obstructions on one side, thus permitting the passenger to disengage himself from said member without detaching any fastening elements, the connections between the conveyor members and rope comprising a front and a rear hanger arranged on the traction rope for each of said conveyor members, each conveyor member being secured to the respective front hanger for towing action, and a yielding conveyor lifting device intercalated between each conveyor member and its respective rear hanger permitting lowering the conveyor member into towing position and automatically compensating the varying elevation of the traction rope above the snow and for restoring the conveyor member to raised position when released.

8. In a ski tow, a traction rope, means for supporting said rope elevated above the ground, means for circulating said rope, conveyor members articulately connected with said rope and circulating together with said traction rope, a projecting portion on each conveyor member extending transversely to the direction of towing for freely engaging and pushing the body of the passenger from behind in the vicinity of his center of gravity while standing on his skis and leaning against said portion, said portion being free of obstructions on one side, thus permitting the passenger to disengage himself from said member without detaching any fastening elements, the connections between the conveyor member and rope comprising a front and a rear hanger arranged on the traction rope for each of said conveyor members, a flexible haul member interconnecting each conveyor member with the respective front hanger for towing action, and a yielding conveyor lifting device intercalated between the conveyor member and the respective rear hanger permitting lowering the conveyor member into towing position and automatically compensating the varying elevation of the traction rope along the roadway and for restoring the conveyor member to raised position when released.

9. In a ski tow, a traction rope, means for supporting said rope elevated above the ground, means for circulating said rope, conveyor members articulately connected with said rope and circulating together therewith, a projecting portion on each conveyor member extending transversely to the direction of towing for freely engaging and pushing the body of the passenger from behind in the vicinity of his center of gravity while standing on his skis and leaning against said portion, said portion being free of obstructions on one side, thus permitting the passenger to disengage himself from said member without detaching any fastening elements, the connections between said conveyors and rope comprising a hanger arranged on the traction rope in correlation to each conveyor member and serving as a rear hanger for the preceding conveyor and as a front hanger for the succeeding conveyor member, a yielding conveyor lifting device intercalated between the preceding conveyor member and the hanger for permitting lowering said conveyor member into towing position and for automatically compensating the varying elevation of the traction rope above the roadway and for restoring the preceding conveyor member to raised position when released, and a flexible haul member interconnecting the succeeding conveyor member with the hanger.

ERNST CONSTAM.